(12) United States Patent
Kim (10) Patent No.: US 11,762,364 B2
(45) Date of Patent: Sep. 19, 2023

(54) AUTOMATED PROGRAMMING OF A PROGRAMMABLE-LOGIC CONTROLLER (PLC) OF A MICROCONTROLLER USING AN EXPERT SYSTEM

(71) Applicant: Valentin Lvovich Kim, Moscow (RU)

(72) Inventor: Valentin Lvovich Kim, Moscow (RU)

( * ) Notice: Subject to any disclaimer, the term of this patent is extended or adjusted under 35 U.S.C. 154(b) by 52 days.

(21) Appl. No.: 17/548,748

(22) Filed: Dec. 13, 2021

(65) Prior Publication Data
US 2022/0100160 A1 Mar. 31, 2022

Related U.S. Application Data

(63) Continuation-in-part of application No. 16/348,632, filed as application No. PCT/RU2018/000061 on Feb. 5, 2018, now abandoned.

(30) Foreign Application Priority Data

Aug. 18, 2017 (RU) ................................ 2017129379

(51) Int. Cl.
*G05B 19/05* (2006.01)
(52) U.S. Cl.
CPC ......... *G05B 19/056* (2013.01); *G05B 19/054* (2013.01); *G05B 19/058* (2013.01)
(58) Field of Classification Search
None
See application file for complete search history.

(56) References Cited

U.S. PATENT DOCUMENTS

| | | | | |
|---|---|---|---|---|
| 5,774,355 A | * | 6/1998 | Mizuno | G05B 19/056 710/1 |
| 6,449,715 B1 | * | 9/2002 | Krivoshein | G05B 19/4185 713/1 |
| 2003/0004670 A1 | * | 1/2003 | Schmit | G06F 8/71 702/123 |
| 2003/0061274 A1 | * | 3/2003 | Lo | G05B 19/056 709/203 |
| 2004/0098141 A1 | * | 5/2004 | Martin | G05B 19/056 719/331 |

* cited by examiner

*Primary Examiner* — Charles E Anya
(74) *Attorney, Agent, or Firm* — Nadya Reingand (57) ABSTRACT

The invention relates to methods and systems for automating equipment. The claimed method comprises steps in which: an expert system (ES) receives a set of information regarding equipment connected to a PLC; the ES checks the received set of information; a set of functions is determined by the ES for each connected type of equipment; the ES generates a set of commands executable by the PLC and corresponding to the functions of the connected equipment using pre-programmed algorithms for generating program commands; the ES generates interactive prompts for connecting devices to the PLC; information containing at least the above-mentioned set of commands is transmitted to the PLC; at least one device is connected to the PLC and execution of at least one command corresponding to at least one function of the above-mentioned device is activated.

18 Claims, 5 Drawing Sheets

AUTOMATED PROGRAMMING OF A PROGRAMMABLE-LOGIC CONTROLLER (PLC) OF A MICROCONTROLLER USING AN EXPERT SYSTEM

CROSS-REFERENCE TO RELATED APPLICATIONS

The present patent application is a Continuation-in-Part of U.S. patent application Ser. No. 16/348,632, filed May 9, 2019, which is a National Stage Application from PCT Application Ser. No. PCT/RU2018/000061, filed Feb. 5, 2018, which in turn claims priority to Russian Patent Application Ser. No. RU2017129379, filed Aug. 18, 2017. All of the above applications are incorporated herein by reference in their entireties.

FIELD OF THE INVENTION

The claimed invention relates to methods and systems for equipment automation in a single operation environment for use in intelligent control systems of "Smart Home" type.

BACKGROUND OF THE INVENTION

At present, the main disadvantage of technical solutions known in the art is lack of a simple and intuitive method of integrating several connectable devices into a single space when they are connected to a programmable logic controller (PLC) or a microcontroller.

In general, creation of "smart houses" means automation of house engineering systems by means of programmable logic controllers (PLC). A peculiar feature of PLC-based systems is the necessity of programming controllers "on the spot" for each particular object individually. This process is only partially simplified by VPN means, which does not preclude the process of individual programming itself and the necessity of directly interacting with each controller in the process of tuning up an individually written control program for a PLC. The system programming usually takes place already after mounting and connecting all devices; since works on assembling a panel, its "wiring" and programming are performed by different specialists, then this aspect inevitably adds the negative element of "human factor" to the process of tune-up, set-up and further operation.

A programmable multimedia controller with programmable functions is known (Patent RU 2460119, Aug. 27, 2012) that is a programmable multimedia controller designed for domestic and commercial use, professional work with audio or video, broadcasting or studio work, ensuring security, automation or other applications, which is designed so as to be capable of interacting with, controlling and managing a wide range of audio and video apparatus, communication devices, data transmission devices, etc.

A disadvantage of this solution is the necessity of programming a controller manually when connecting a plurality of devices thereto, which requires special skills and intervention of a specialist. Further, this solution does not enable to generate prompts relating to the process of connecting devices and perform PLC programming on the basis of interactive programming environment.

SUMMARY OF THE INVENTION

The technical object of the claimed invention is to simplify the process of programming a PLC after connecting to it a plurality of devices through the use of an expert system (ES) that, on the basis of information on equipment to be connected, as received from the user, automatically generates program modules required for operation of such devices, as well as follows the process of connecting such devices by generating interactive prompts.

The technical effect to be achieved is to ensure the process of connecting a plurality of devices to a PLC by means of an interactive programming environment, which accelerates and simplifies this process due to information processing by an expert system that automatically generates necessary program instructions for devices to be connected to the PLC.

Further, an additional effect of using the invention consists in reducing the risk of incorrect connection of equipment or failure thereof, since the connection process is accompanied by interactive prompts and well as by indication of connectors required for connecting devices.

The invention is realized by means of a method of ES-assisted PLC automated programming for controlling a plurality of devices, the method comprising the following steps:

the ES receives a set of data on equipment to be connected to the PLC;

the ES checks the set of data thus received;

the ES is used for determining a set of functions for each type of the equipment to be connected;

the ES generates a set of instructions to be executed by the PLC that correspond to the functions of the equipment to be connected;

the ES generates interactive prompts for connecting the devices to the PLC;

at least one device is connected to the PLC, and execution of at least one instruction is activated that corresponds to at least one function of the device.

In a particular embodiment of the method, a set of data on equipment is received through the graphic user interface.

In another particular embodiment of the method, the graphic user interface comprises hierarchically structured information on equipment presented in the text or graphic format.

In yet another particular embodiment of the method, the ES comprises a "Knowledge Base" containing information on equipment, information on typical solutions, possible settings and variants of connecting equipment to the PLC, algorithms for generating software, data on hardware of the PLC.

In still another particular embodiment of the method, received data on equipment to be connected to the PLC is checked by the ES for consistency with the information stored in the ES.

In yet another particular embodiment of the method, the ES generates a set of instructions for two or more PLCs combined in a single network.

In still another particular embodiment of the method, data on equipment to be connected is selected among variants chosen by the ES on the basis of information provided by the user through a graphic interface.

In yet another particular embodiment of the method, variants are formed on the basis of information on the premises and the required functionality, the information comprising at least one parameter selected from each group, such as:

the purpose of the premises;

the types of controllable devices;

the method of controlling a device or a group of devices;

the control means;

the form of controlling a device;

the number of controlled devices.

the number of controlling devices.

In still another particular embodiment of the method, a set of data on equipment is formed with the use of templates stored in the ES.

In yet another particular embodiment of the method, data on equipment is selected with the use of graphic presentations of equipment pieces.

In still another particular embodiment of the method, at least one graphic presentation is additionally generated when a piece of equipment is selected, said graphic presentation being selected from the group comprising: control means for the equipment, variants of controlling the equipment, variants of combining equipment pieces into groups.

In yet another particular embodiment of the method, when a graphic presentation of a piece of equipment is activated, its description is displayed comprising at least a type and a model of the equipment.

In still another particular embodiment of the method, functions of devices are determined with the use of the ES knowledge base.

In yet another particular embodiment of the method, the knowledge base is stored in a remote data storage device.

In still another particular embodiment of the method, when the function of a device is determined, variants of execution state for the functions are determined.

In yet another particular embodiment of the method, generation of instructions for the PLC includes function execution states for each of devices to be connected.

In still another particular embodiment of the method, interactive prompts are shown on the PLC display and/or on a user remote device.

In yet another particular embodiment of the method, the user device is a stationary control panel, a phone, a smart phone, a tablet PC, a notebook or a desktop computer.

In still another particular embodiment of the method, interactive prompts for connecting devices additionally include indication of the PLC I/O interfaces for connecting devices.

In yet another particular embodiment of the method, indication is light indication.

In still another particular embodiment of the method, light indication for several devices connected simultaneously is provided in different colors.

In yet another particular embodiment of the method, color indication is repeated in prompts on the graphic user interface for the respective devices.

In still another particular embodiment of the method, a design solution for equipment to be connected is additionally generated.

In yet another particular embodiment of the method, project documentation for equipment to be connected is additionally generated.

In still another particular embodiment of the method, after connecting at least one device to the PLC automatic diagnostics of said device is performed.

The claimed invention may be also realized by means of a PLC automated programming system with the use of a ES intended for controlling a plurality of device, said system comprising:

at least one processor;

at least one memory containing machine-readable instructions that make said at least one processor to:

receive, through the ES, a set of data on equipment to be connected to the PLC;

check, through the ES, the received set of data;

determine, through the ES, a set of functions for each type of equipment to be connected;

generate, through the ES, a set of instructions to be executed by the PLC that correspond to the functions of the equipment to be connected;

generate, through the ES, interactive prompts for connecting the devices to the PLC;

transmit data thus formed to the PLC;

connect said at least one device to the PLC and activate execution of at least one instruction corresponding to said at least one function of said device.

In one particular embodiment of the system the ES is included into a remote device.

In one particular embodiment of the system the ES is included into the PLC, and the knowledge base is included into a remote device.

In another particular embodiment of the system, said remote device is a server.

In yet another particular embodiment of the system, a set of data on equipment is received with the use of a graphic user interface.

In another particular embodiment of the system, data on equipment is selected with the use of graphic presentations of equipment pieces.

In another particular embodiment of the system, when a graphic presentation of a piece of equipment is activated, its description is displayed including at least a type and a model of the equipment.

DETAILED DESCRIPTION OF THE PREFERRED EMBODIMENT

Figure 1:
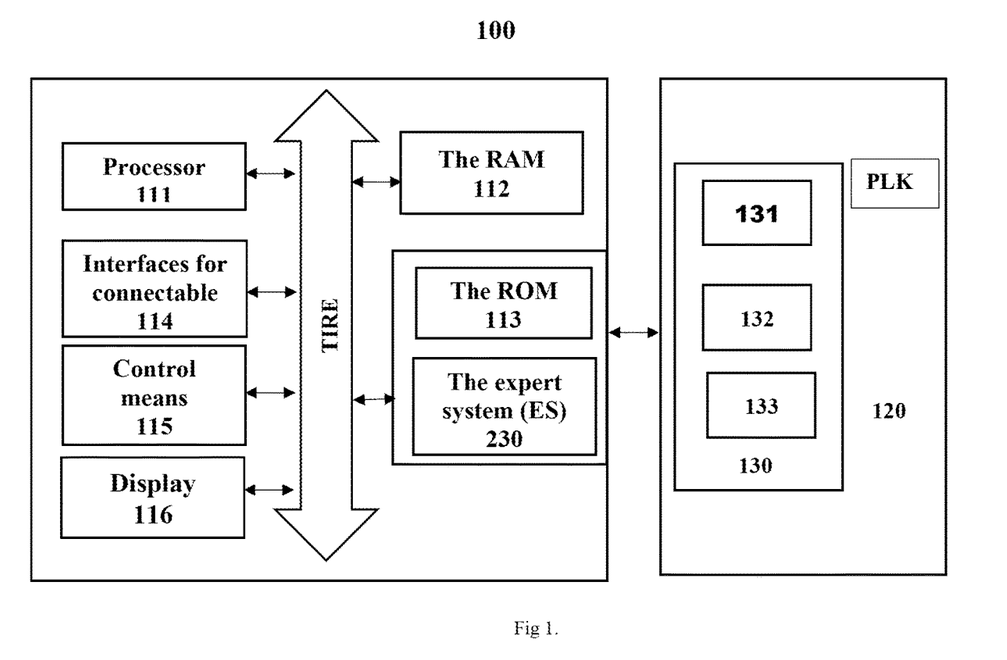
FIG. 1 shows an example of connecting devices to the PLC.

Here According to FIG. 1, the claimed solution may be realized by means of a system (100) comprising a device, particularly a computer (110), generating instructions for a PLC (120) and devices (130) to be connected thereto. Devices (131-133) may be, but not limited to: sensors, switches, actuators, relays, routers, lighting equipment, rolling shutters, power outlets, elements of the Internet of Things (IoT), domestic appliances, audio/video equipment etc. Any type of devices capable of being centrally controlled through a PLC may be used in the claimed system (100).

Generally, the computer (110) executing the ES (230) comprises one or more processors (111) performing the main computing operations, said processors being combined through a bus, the RAM (112), the ROM (113) that may be provided as a HDD, SSD, flash drive, etc. The PLC (120) also comprises various interfaces for connectable devices (114), e.g., LAN, USB, PS/2, COM, FireWire, etc.

The computer (110) and the PLC (120) also may comprise modules for supporting wireless data exchanges, e.g., Bluetooth, WLAN (Wi-Fi), IrDa, NFC, BLE, GSM-modem (2G, 3G, 4G, 5G).

The PLC (120) may be selected from a wide range of devices having this profile, e.g., Modicon 984 provided by Shneider Electric company. Generally, the PLC (120) comprises a central processing device (CPU), a memory for storing user status and program, input modules, an I/O processor, output modules, and a communication processor.

The computer (110) may comprise control means (115) for interacting with the user, e.g., a touch screen, a keyboard, or it may be provided without said means and operate on the base of, for example, a thin client server, in such a case it being controlled by means of connecting to a user remote control device, e.g., a stationary control panel, phone, smart phone, tablet PC, notebook, or desktop computer.

The PLC (120) may comprise control means (115) for interacting with the user, e.g., a touch screen, a keyboard, or it may be provided without said means and operate on the base of, for example, a thin client server, in such a case it being controlled by means of connecting to a user remote control device, e.g., a stationary control panel, phone, smart phone, tablet PC, notebook, or desktop computer. A protocol for communicating with a remote device is selected from conventional protocols for information exchange and transmission.

Also, the PLC (120) may comprise a conventional display (116), e.g., a LCD-display for visualizing necessary information in the process of connecting various devices.

The ROM (113) of the computer (110) stores the expert system (ES) (230) enabling to ensure quick and simple connection of various devices (130) to the PLC (120). The operating principle of the ES (230) will be described hereinbelow.

Figure 2:
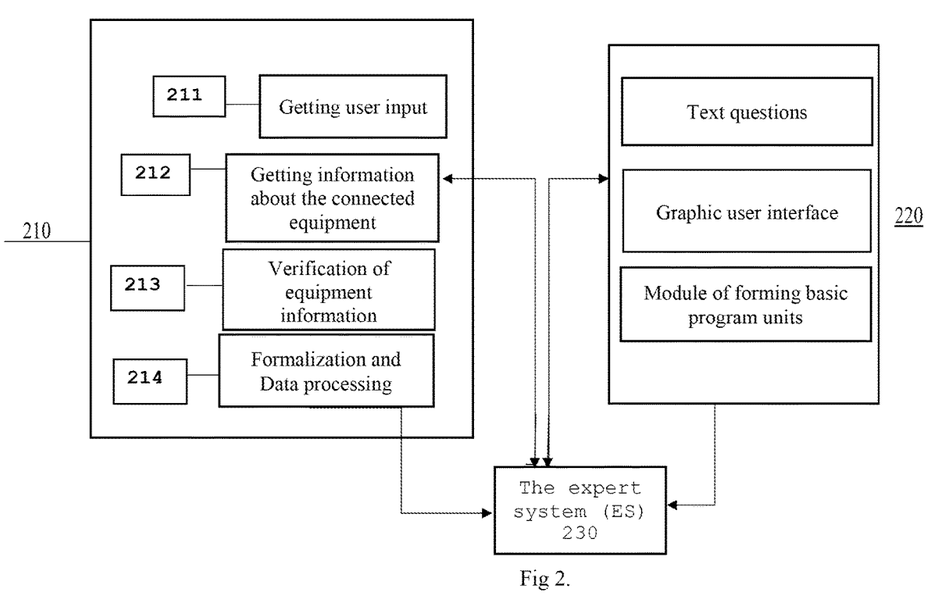
FIG. 2 shows an example how the method of connecting devices and processing of data works.

As FIG. 2 shows, when a user configures the PLC (120), the main interaction takes place in the interactive programming environment (210) with the use of the ES (230).

In the Step 211, the interactive programming environment requests input of data on devices (130) to be connected, for which the user is invited to use several possible functions displayed on the graphic user interface of the ES (230).

In the Step 212, textual descriptions of equipment are generated with the use of the graphic user interface and the "Knowledge Base" (220) exchanging data with the ES, said descriptions may be subdivided into equipment type categories, such as sensors, power outlets, lamps, etc. These descriptions may be additionally duplicated as graphic presentations of the equipment. For the purpose of selecting equipment of required type questions to the user are generated in the interactive programming environment, which are provided as a hierarchical list for obtaining information of a specific type of equipment to be connected.

Graphic presentations of equipment, as displayed on the user interface, may also include equipment control means, variants of equipment control, variants of combining equipment pieces in groups. During this process, when a graphic presentation of a piece of equipment is activated, its description is displayed that comprises at least the equipment type and model.

Answers of the user are structured according to templates stored in the Knowledge Base and are checked by the system for correctness and applicability (Step 213). If an irrelevance is found in answers of the user, back-off to the questions on equipment is performed until correct information is obtained.

The step of interactive programming is completed by the step of formalizing data (214) obtained from the user and transferring it to the ES (230).

The knowledge base (220) also comprises, apart from data on equipment, information on typical solutions, possible settings and variants of connecting equipment to the PLC (120), algorithms for generating software for devices to be connected, and information of the PLC hardware.

In the Step 212, when data is inputted with the use of the knowledge base (220), the computer (110) follows the user in the procedure of connecting devices (130) to the PLC (120). When advancing along a dynamic hierarchical tree of questions, the programming environment (210) determines necessities of the user and after each question minimizes the number of required questions by optimizing their list. After necessities of the user in respect of equipment to be connected are determined, and/or required functions and/or control scenarios are programmed, the obtained data is formalized (214), and, on its basis, individual software for programming the PLC (120), is formed with the use of the ES (230), as well as necessary documentation. Necessary software is generated by the ES (230) through forming instructions for controlling the equipment to be connected (130) because it comprises special algorithms.

The ES (230) may also comprise information on the hardware of the PLC (120), in particular, the number and the purpose of channels, proceeding from the identification number of the PLC hardware, in order each electric channel may be operated by the respective program correctly.

While determining functions of the equipment (130), variants of states of these functions during their execution are also determined, e.g., trigger events (open/closed, presence of an external factor, such as temperature, smoke, time of the day, etc.).

Equipment (130) to be connected may be also automatically recognized by the ES (230) on the basis of conventional identification protocols.

When the primary information on a piece of equipment to be connected is received from the user through the knowledge base (220), possible functions of the equipment it may fulfill are also determined.

Figure 3:
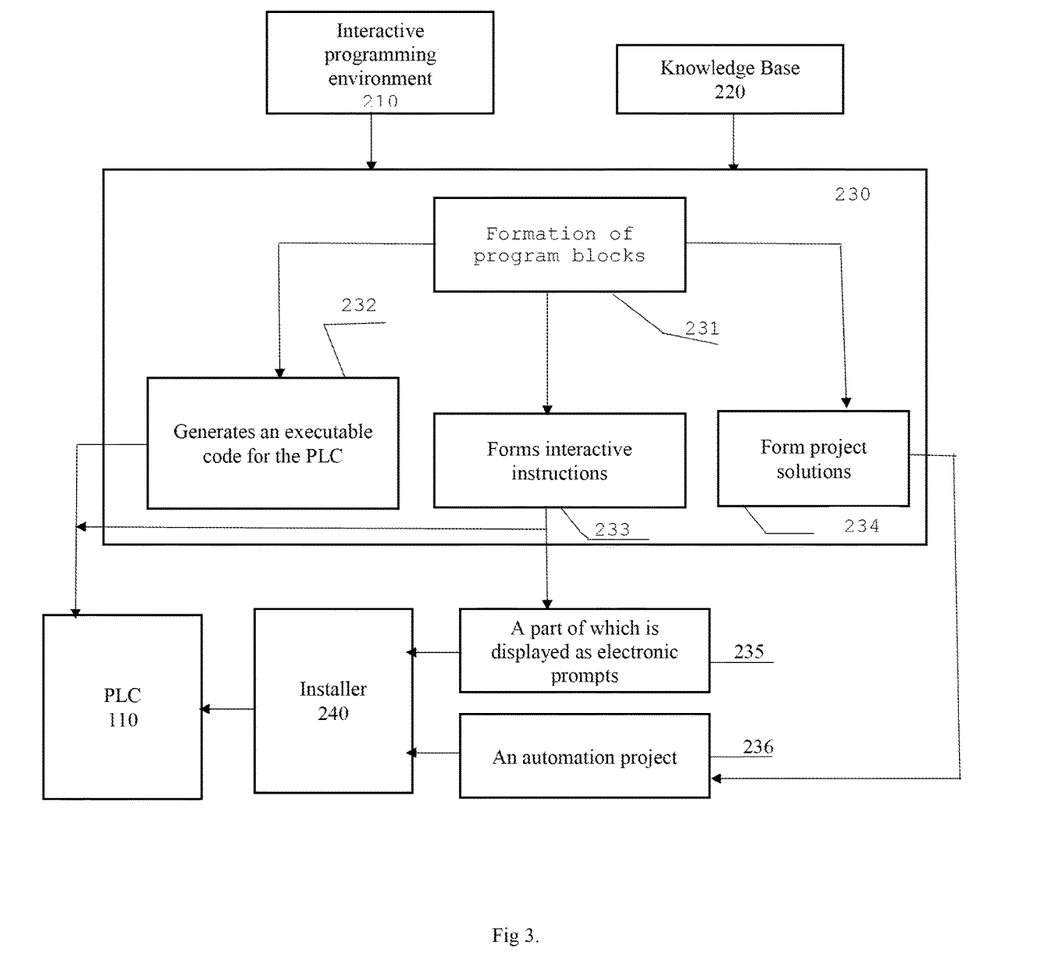
FIG. 3 shows the principle of the ES operation and information transmission to the PLC.

FIG. 3 shows the operation of the ES (230). Information on the equipment to be connected, as received from the user, after checking and formalizing it in the interactive programming environment (210), is transmitted to the ES (230).

The module of forming basic program units (231) generates an executable code for the PLC (120) (Step 232), in order to support operation of the devices (130). Then, the ES (230) forms interactive instructions (233), a part of which is displayed as electronic prompts (235) on the graphic interface of the installer (240) (in the PLC or a remote device), and the other part is integrated into the program for the PLC (120) in order to provide the PLC (120) itself with possibilities for interactive follow-up of its installation. In addition to prompts for following connection of devices with the use of the computer (110), instructions of indicating connectors on the PLC (120) are generated for the purpose of connecting the required devices thereto. This indication may be, e.g., light indication with the use of LEDs arranged in said connectors. Also, the indication may be subdivided by color presentation (e.g., yellow, blue, red, etc) and may be duplicated by the corresponding color on the graphic interface. These functions enable to avoid wrong connection of the devices.

The ES (230) also enables to form project solutions (234) that may be automatically printed out by user printing means (if connected to a printer). When a project solution (234) is formed, an automation project (236) is also generated, and information of the types of the equipment to be connected and their operation scenarios is transmitted to the graphic interface of the installer (240) for the procedure of indicating connectors and providing interactive prompts on the graphic user interface. This all is necessary, in order a formed automation project of operation of the devices (130) to be connected to the PLC (120) may be implemented by the user when connecting the devices to the PLC (120).

The ES (230) may form instructions for two or more PLCs (120) that are combined to form a network. In such a case, software is formed sequentially for each PLC, since the user provides the identification number of the PLC hardware to the ES (230) in the interactive programming environment, and the hardware capabilities, number and purpose of the channels are available from the knowledge base of the ES (230) by the identification number of the PLC hardware.

The ES (230) generates variants of connecting equipment on the basis of information received from the user, such generation being based on information on the premises and on the required functionality, which comprises at least one parameter selected from each group:

purpose of the premises;
types of controllable devices;
method of controlling a device or a group of devices;
control means;
form of controlling a device;
number of controllable devices;
number of control devices.

This information is provided by the user in the interactive programming environment (210) and then is processed with the use of the knowledge base (220) and the ES (230).

Figure 4:
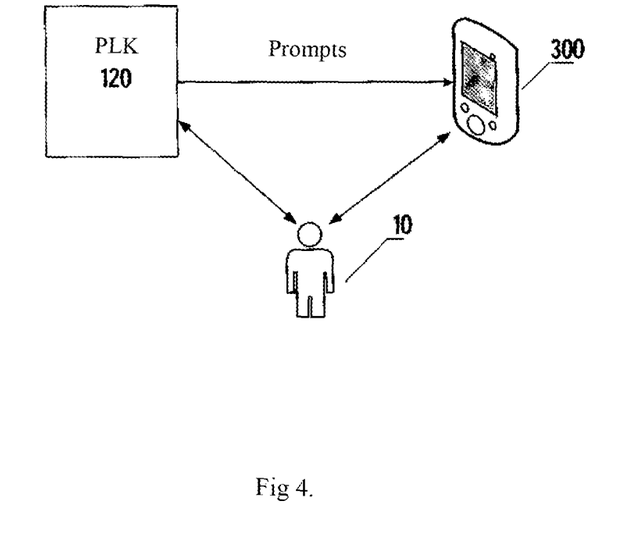
FIG. 4 shows the principle of transmission and display of prompts for connecting the equipment.

FIG. 4 shows an example of displaying interactive instructions on the user device (300), e.g., on a smart phone. Information for the PLC (120) may be also provided through the smart phone (300).

In addition, information, apart from being selected with the graphic user interface of the smart phone (300), may be obtained through processing of photo images caught by a smart phone camera, their recognition with various program algorithms used for recognizing images and transferring such information to the knowledge base (220) for comparison.

The knowledge base (220) may be included not only into the ROM (113) of the computer (110), but also into a remote device coupled to the PLC (120) via a data channel of wired or wireless type, e.g., into a server. The server (110) may be a cloud storage provided with the function of updating information, which enables to update data on various types of equipment dynamically.

Figure 5:
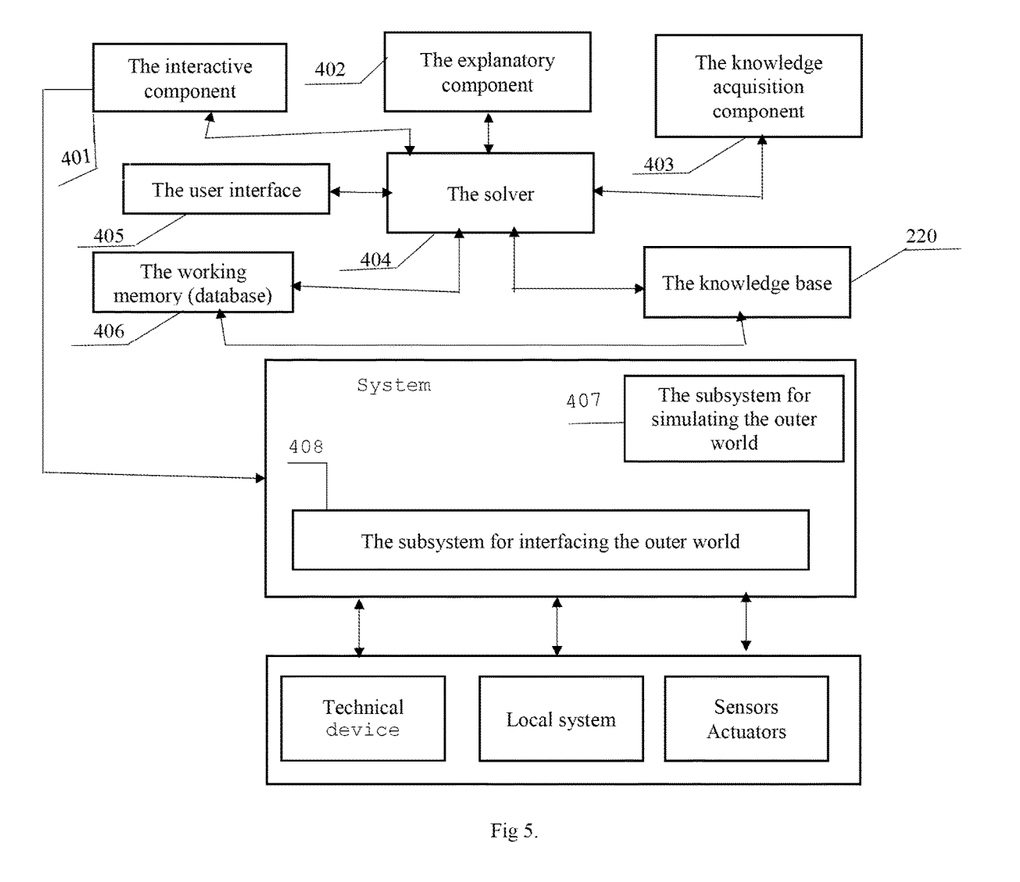
FIG. 5 shows an example of the ES schematic diagram.

FIG. 5 shows an example of the ES schematic diagram (230). The interactive component (401) is oriented to organizing friendly communication with the user (organization of a man-machine interface) both in the course of solving the task, and in the process of acquiring knowledge and explaining results of operation.

The explanatory component (402) generates the process of explaining how the system has got a solution of a task (or why it has not got a solution) and what knowledge it has used therefore, which facilitates testing the system by an expert and improves trust of the user in a result achieved.

The knowledge acquisition component (403) automates the process of providing knowledge to the ES (230), which can be carried out by an experienced user, an engineer or an end user.

The solver (404) forms, through using source data from the working memory (406) and knowledge from the knowledge base (220), a special sequence of rules that, when applied to said source data, lead to getting a solution of the task.

The user interface (405) comprises graphic user interfaces for various categories of users and has a structured natural-language interface with control via a menu and with automatic syntax check, a graphic switching plot, diagrams, scales, buttons, a multi-layer icon editor, source data interfaces providing efficient connection with external systems and data bases, etc.

The working memory (database) (406) is intended for storing source and intermediate data relating to a task being solved at the present time. This term coincides by name, but not by meaning, with the term used in information retrieval systems (IRS) and database management systems (DBMS) for indicating all data (primarily long-lived data) stored in a system.

The knowledge base (KB) (220) is intended for storing knowledge on applications, determining all and any objects, objects, rules, procedures, long-lived data describing a field under consideration (rather than current data), and rules describing appropriate transformation of data in this field. This unit additionally comprises a library of knowledge (LoK) wherein general knowledge is stored that may be used in more than one application, e.g., determination of standard objects connectable to the PLC.

The subsystem for simulating the outer world (407) is necessary for programming, analyzing and adequately assessing a condition of the external environment.

The subsystem for interfacing the outer world (408) is intended for analyzing changes in the environment of a task being solved, which also requires changes in the knowledge stored in the Expert System so as to reflect time logic of events occurring in the real world. The component of communicating with the outer world is actual for autonomous intelligent systems (e.g., robots) as well as for intelligent control systems. The communication with the outer world is realized through a system of sensors and actuators under control of local controllers.

The claimed solution is an intelligent hardware-software system that may be realized with the use of various conventional technical means, such as, in particular, computing devices (processors, microcontrollers, etc.), storage devices for information of non-temporary and temporary types, means for inputting and displaying information, etc.

The knowledge base (220) stores the methodical aids, i.e., the hardware and software tools supporting the conduction of technical processes without the direct involvement of a human into routine operations of creating project solutions for the automation and software of a connected PLC.

The knowledge base (220) comprises an augmented data array. Data stored within the knowledge base may be updated via two methods: 1) through the adding of information by a knowledge engineer in cooperation with a programmer involved in the development or updating of tools; or 2) through the subsystem for interfacing the outer world (408), in the form of feedback received from those final solutions which have been implemented. In both of such methods, data is verified by an expert in a problem domain for its correct application (i.e., in finding a proper solution for one or more tasks).

The initial filling and the updating of the knowledge base is performed via the knowledge acquisition component (403).

The algorithm of the software developed for the present invention comprises six segments/steps, wherein each segment/step comprises an independent tree of objectives.

The first step comprises a qualitative and quantitative collection of initial data via the following tools: (1) Question-answering menu; (2) Interaction through forms (pictograms); (3) Graphic editor; (4) Image editor; and (5) Additional elements of interaction interfaces.

In the second step, the ES acts without involvement of a human due to machine processing of initial data collected in the first step. The second step comprises: (1) ICAD computational process is performed; (2) A project solution is formed, wherein hardware channels are bound to actuators, sensors of connectable devices according to types of electric or information signals of a device itself; (3) An initial data block is formed for the next "Programming" step; and (4) An explanatory component block is formed for an installer.

The resulting output of the second step comprises: (1) A list of objectives; (2) Solutions for said objectives; (3) A list of I/O signals; (4) Specifications of connectable devices; (5) Drawings of project solutions; and (6) Functional/structural charts for said installer.

In the third step, a program code for a particular case is compiled on the basis of said initial data and with the utilization of a skeleton software driver library. The result is an individual PLC software supporting the operation of a particular hardware according to the selected scenario. The result further enables the user to control functions, e.g., a light switch, to support monitoring and security functions required for electrical safety, and to control the recording of necessary measurements.

The PLC software created in the third step comprises: (1) Initial data sheets; (2) A set of algorithms for conducting technical processes; (3) Rules for connecting to hardware components; (4) Matrix tables for applied types/kinds of other device specifications; and (5) Rules for links between drivers.

In the fourth step, a mounting instruction for said installer is formed.

The fifth step comprises the step of initial connection between the software created and one or more devices, via the PLC, including performing diagnostics of any connectable devices. During this step, the subsystem for interfacing the outer world (408) begins to provide feedback (i.e., data on the functioning of the created/connected system in real time) and also prevents the incorrect connection of devices.

The sixth step comprises the initiation of an external world modeling system, which is a computer model of a project and software that is generated by the Expert System. The external world modeling system is capable of reproducing various states of said external world in various conditions and describing an object and processes occurring therein.

In turn, the subsystem for modeling/simulating the outer world enables the testing of the created system's operation in various conditions and modes, making corrections in a created project if drawbacks are identified. The outer world simulating/modeling subsystem visualizes links between program components and physical processes.

The outer world modeling subsystem further facilitates the understanding of device operations for the user, the tuning of device operations, and the modifying of device operation scenarios via a graphic interface.

The "Solver" is another subprogram of the Expert System. The Solver algorithm is aimed at achieving objectives on generating a project solution, starting from forming a Task presented by the User. The User communicates with the machine through an HMI (human-machine interface). The "Solver" interprets and formalizes the User's task into a Performance Specification with the help of the logic developed by the expert system. The generated Performance Specification will never contradict the applied technical rules and will always be technologically feasible.

The next step of the Solver comprises addressing the "project solutions", "commands and technologies", and "drivers and program components" logic blocks. In accordance with the generated Performance Specification, the logic blocks select an optimal variant of a project solution. The Solver issues such project solution in the form of drawings, calculation results, equipment specifications, an explanatory note, and firmware personally compiled for a connected PLC.

The "Project Solutions" logic block comprises the following expert knowledge: (1) Project solution templates; (2) Schematic diagrams; (3) An augmented list of hardware (actuators, transducers, sensors) with specifications; (4) Catalogs of items and instruments; (5) Calculation equations and formulas for designing; (6) Types of electrical signals; (7) Types of communication protocols.

This block also receives initial technical data inputted by the User, such as an existing object layout, technical specifications for connection to public networks, and limitations applicable to the User's equipment.

The "Commands and Technologies" logic block either proposes that the User select control commands manually, or it provides the possibility of applying commands most frequently used by other users.

The "Solver" checks all data, as inputted or selected by the User, for technical compliance and technological compatibility. If the checked result is negative, it proposes to change the solution. If the checked result is positive, it continues to form a project solution and software.

Requirements and calculations, as applied by the "Solver", are then stated in the project solution.

Additional information comprising references to hardware, standards, rules, etc., as selected for implementation, is contained in the "Explanatory Component". If contradictory conditions are set for generating a project, the "Solver" proposes variants for changing initial data. The "Explanatory Component" issues corresponding references to the standards, rules, hardware, etc.

The "Explanatory Component" receives a finalized project solution from the "Solver". The "Explanatory Component" can thus explain how the "Solver" selects certain hardware, standards, and rules, sets functions, thereby forming a detailed Explanatory Note with references to the data used.

If a User's initial task is contradictory, the "Explanatory Component" forms references to data proposed by the Solver for modification.

The "Knowledge Acquisition Component" (403) automates the process of filling the ES with knowledge in the following stages:

In the first stage (of filling the Knowledge Base): knowledge is added to the ES with the use of specially developed interface templates. In this stage, data marked by an expert is automatically combined into various arrays, based on the following logic: (1) According to a field of knowledge; (2) According to a type of a task to be solved; (3) According to a type of an objective to be achieved; or (4) According to other features.

In the second stage, the algorithms, as developed for the present invention, enable the subsequent decomposition of the initial input data, the establishing of mutual links between technical parameters of various input data, and the setting of priorities for using the input data in achieving an objective.

The Solver selects, in accordance with the initial input data, the appropriate/required knowledge (i.e., rules) from the Knowledge Base, while at the same time establishing a priority of the knowledge, i.e., an order of hierarchy in deriving the rules.

The User Interface (405) comprises a unique combination of several independent languages for interaction with a computer/processor. This unique combination comprises: (1) DDL—data description language (graphic); (2) DML—data manipulation language; (3) IL—intermediate language (before a compiler); (4) CL—compiled language; and (5) ML—meta-language (structural description of infographics).

The subsystem for simulating the outer world (407) is an ES subprogram which performs monitoring and control functions, comprising:

A data collection and index calculation system used for the purposes of collecting full information about the system in real time and storing collected/history data; and A system for automatic management of external state control and diagnostic functions for providing safe performance of technological processes, protection against unauthorized operation modes, and minimization of consequences of abnormal operation.

The program components of the subsystem for simulating the outer world (407) comprise: (1) A list of objectives; (2) Solutions for said objectives; (3) A list of I/O signals; (4) Specifications of connectable devices; (5) Drawings of project solutions; and (6) Functional/structural charts for said installer.

The subsystem for interfacing the outer world (408) organizes inter-machine interaction between the client, server, and a connected PLC, in order to ensure the correct connection of devices and the receipt of feedback on their operation.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for automated programming of a programmable logic controller (PLC) through an expert system (ES) for controlling a plurality of devices, the method comprising:
    the ES receives a set of data on at least a first device to be connected to the PLC;
    the ES checks the set of data thus received;
    the ES determines a set of functions for at least the first device to be connected;
    the ES generates a set of instructions to be executed by the PLC that correspond to the functions of at least the first device to be connected, using algorithms of generating program instructions;
    the ES generates interactive prompts for connecting at least the first device to the PLC;
    data comprising at least said set of instructions is transmitted to the PLC; and
    at least the first device is connected to the PLC, and execution of at least one instruction is activated that corresponds to at least one function of at least the first device,
    wherein the ES generates:
        software for controlling at least the first device, and
        an explanatory component, said explanatory component explaining how the ES obtained a solution based on said set of data on at least the first device to be connected to the PLC, said explanatory component providing data received from a solver, said data from the solver comprising why the solver selected one or more hardware, standards, rules, and functions in creating said software for controlling at least the first device,
    wherein the set of data on at least the first device is received through a graphic user interface,
    wherein the ES further comprises both:
        a subsystem for simulating an external environment, and
        a subsystem for interfacing the external environment,
    wherein said subsystem for simulating the external environment comprises a list of objectives, solutions for said objectives, a list of input/output signals, one or more specifications of connectable devices, drawings of project solutions, and structural charts,
    wherein said subsystem for interfacing the external environment comprises sensors and actuators for providing real time feedback from the external environment based on one or more actively employed software solutions.

2. The method of claim 1, characterized in that the graphic user interface comprises hierarchically structured information on at least the first device, said graphic user interface comprising a combination of data description language, data manipulation language, intermediate language, compiled language, and meta-language.

3. The method of claim 1, characterized in that the ES comprises a Knowledge Base that includes an information on at least the first device, an information on typical solutions, possible settings and variants of connecting at least the first device to the PLC, algorithms for generating software, and data on a PLC hardware, said Knowledge Base comprising an augmented data array, said Knowledge Base being updated via a feedback provided by said subsystem for interfacing the outer world.

4. The method of claim 2, characterized in that data on at least the first device to be connected to the PLC, as received, is checked by the ES for consistency with the information stored in the ES.

5. The method of claim 3, characterized in that functions of the plurality of devices are determined with a use of the Knowledge Base.

6. The method of claim 1, characterized in that the ES generates a set of instructions for two or more PLCs combined in a single network.

7. The method of claim 1, characterized in that data on at least the first device to be connected is selected among variants chosen by the ES on a basis of the information provided by the user through a graphic interface.

8. The method of claim 7, characterized in that variants are formed on a basis of an information on premises and a required functionality, the information comprising at least one parameter selected from each of the following groups:
- a purpose of the premises;
- types of controllable devices;
- a method of controlling one or more devices of the plurality of devices;
- control means;
- a form of controlling;
- a number of controlled devices; and
- a number of controlling devices.

9. The method of claim 7, characterized in that the set of data on at least the first device is formed with templates stored in the ES.

10. The method of claim 9, characterized in that the Knowledge Base is stored in a remote data storage device.

11. The method of claim 1, characterized in that the data on at least the first device is selected with a use of graphic presentations of pieces of at least the first device.

12. The method of claim 11, characterized in that at least one graphic presentation is additionally generated when a piece of at least the first device is selected, said graphic presentation being selected from a group comprising: control means for at least the first device, variants of controlling at least the first device, and variants of combining pieces of at least the first device into groups.

13. The method of claim 11, characterized in that when a graphic presentation of a piece of at least the first device is activated, a description is displayed comprising at least a type and a model of at least the first device.

14. The method of claim 1, characterized in that, when a function of a device of the plurality of devices is determined, variants of execution state for the function are determined.

15. The method of claim 14, characterized in that the generation of instructions for the PLC includes function execution states for each one of the plurality of devices to be connected.

16. The method of claim 1, characterized in that interactive prompts are shown on a PLC display or on a user remote device.

17. The method of claim 16, characterized in that the user device is a stationary control panel, a phone, a smart phone, a tablet PC, a notebook, or a desktop computer.

18. The method of claim 1, characterized in that interactive prompts for connecting the plurality of devices additionally include an indication of PLC I/O interfaces for each one of the plurality of devices.

* * * * *